(12) United States Patent
Shoji et al.

(10) Patent No.: US 12,542,347 B2
(45) Date of Patent: Feb. 3, 2026

(54) VEHICLE ANTENNA DEVICE

(71) Applicant: AGC Inc., Tokyo (JP)

(72) Inventors: Hideaki Shoji, Tokyo (JP); Kiyoshi Nobuoka, Tokyo (JP); Shoichi Takeuchi, Tokyo (JP); Toshiki Sayama, Tokyo (JP); Yusuke Kato, Tokyo (JP)

(73) Assignee: AGC INC., Tokyo (JP)

( * ) Notice: Subject to any disclaimer, the term of this patent is extended or adjusted under 35 U.S.C. 154(b) by 57 days.

(21) Appl. No.: 18/616,700

(22) Filed: Mar. 26, 2024

(65) Prior Publication Data

US 2024/0235014 A1    Jul. 11, 2024

Related U.S. Application Data

(63) Continuation of application No. PCT/JP2022/035786, filed on Sep. 26, 2022.

(30) Foreign Application Priority Data

Sep. 29, 2021  (JP) .................................. 2021-159730

(51) Int. Cl.
*H01Q 1/32*      (2006.01)
*H01Q 9/04*      (2006.01)

(52) U.S. Cl.
CPC ........... *H01Q 1/325* (2013.01); *H01Q 9/0407* (2013.01)

(58) Field of Classification Search
None
See application file for complete search history.

(56) References Cited

U.S. PATENT DOCUMENTS

| | | | |
|---|---|---|---|
| 7,190,316 B2* | 3/2007 | Yegin | H01Q 9/04 343/700 MS |
| 2011/0163904 A1* | 7/2011 | Alland | B60R 11/04 342/52 |
| 2021/0036412 A1 | 2/2021 | Kodama et al. | |
| 2021/0242578 A1 | 8/2021 | Inomata et al. | |
| 2022/0347974 A1 | 11/2022 | Sadakane et al. | |

FOREIGN PATENT DOCUMENTS

| | | | |
|---|---|---|---|
| JP | H04-123603 A | | 4/1992 |
| JP | 2009147557 A | * | 7/2009 |
| JP | 2012-505115 A | | 3/2012 |
| WO | WO-2019/208453 A1 | | 10/2019 |
| WO | WO-2021/125209 A1 | | 6/2021 |

OTHER PUBLICATIONS

International Searching Authority, "International Search Report," issued in connection with International Patent Application No. PCT/JP2022/035786, dated Dec. 6, 2022.

International Searching Authority, "Written Opinion," issued in connection with International Patent Application No. PCT/JP2022/035786, dated Dec. 6, 2022.

\* cited by examiner

*Primary Examiner* — Crystal L Hammond

(74) *Attorney, Agent, or Firm* — Foley & Lardner LLP

(57) ABSTRACT

A vehicle antenna includes: a vehicle window glass an electronic device provided in a vicinity of a vehicle width direction central portion at or near upper portion of the vehicle window glass; and an antenna attached to the upper portion of the vehicle window glass such that a normal to a radiation surface passes through a principal surface. A vehicle width direction central position of the antenna is separated from a reference position that is a vehicle width direction center of the electronic device.

11 Claims, 15 Drawing Sheets

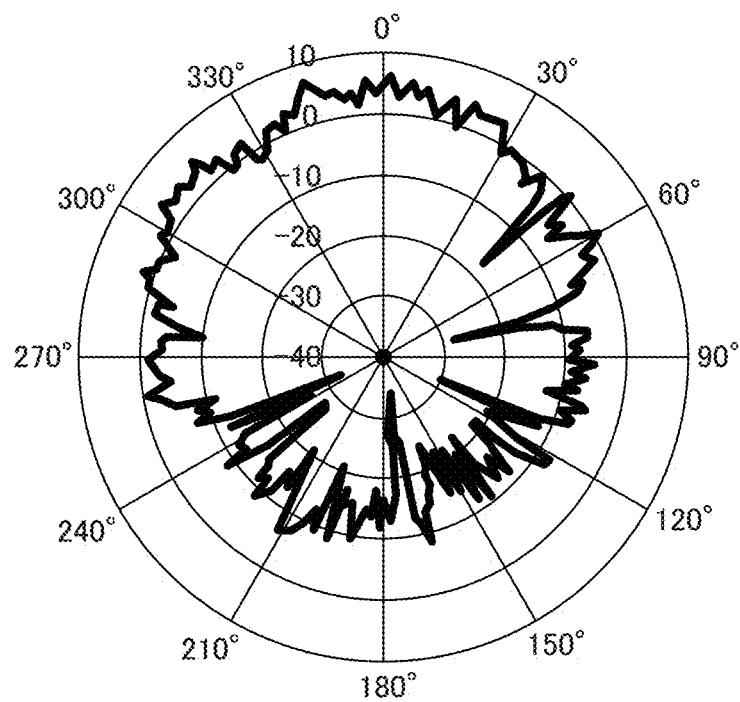

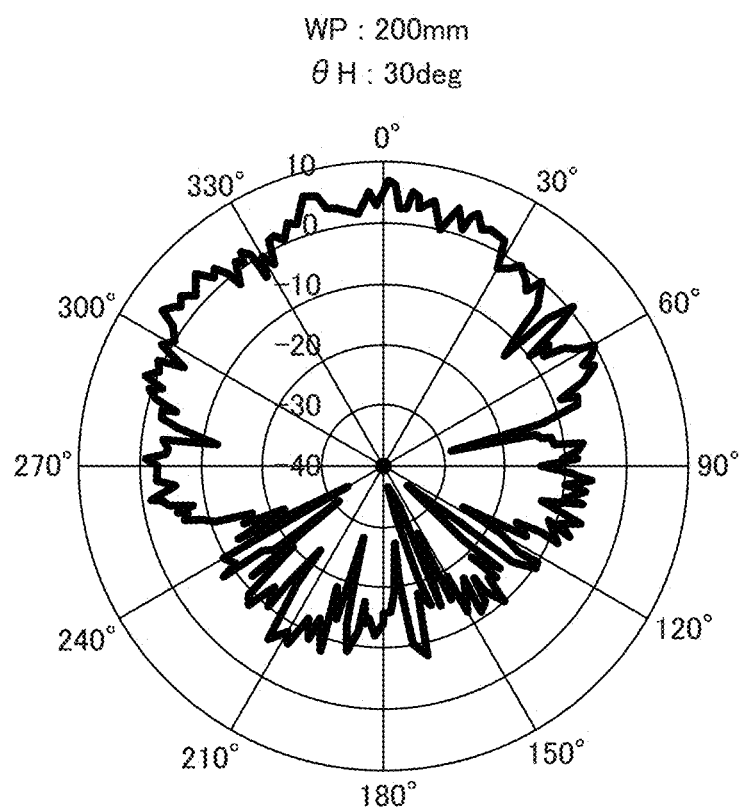

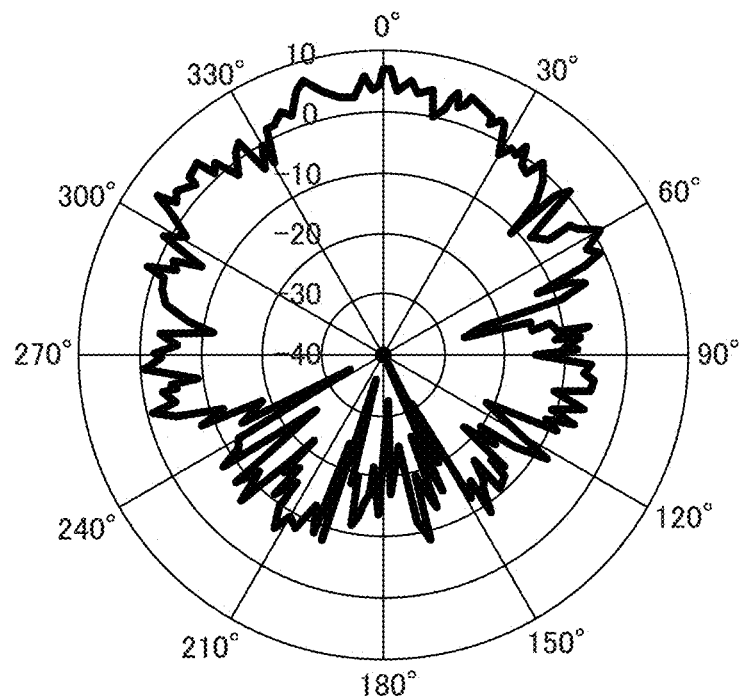

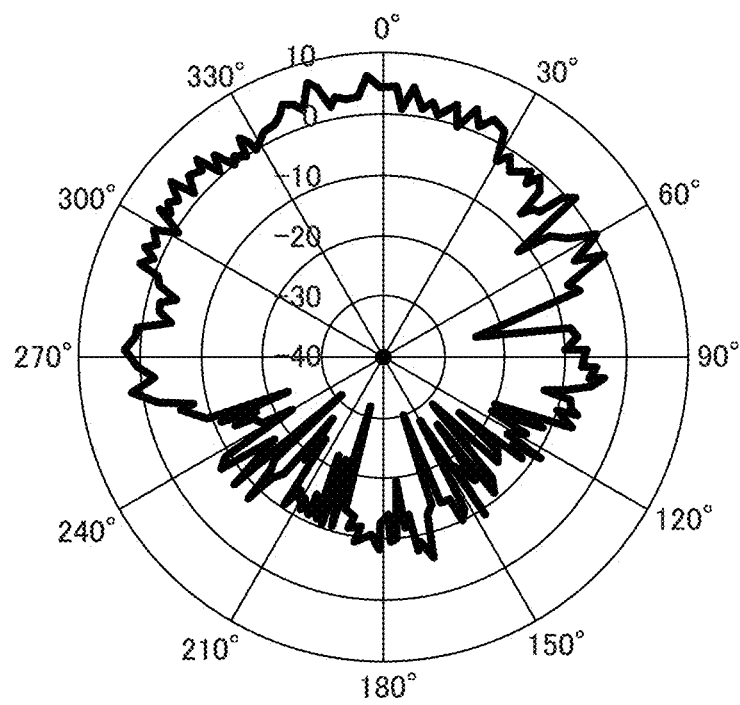

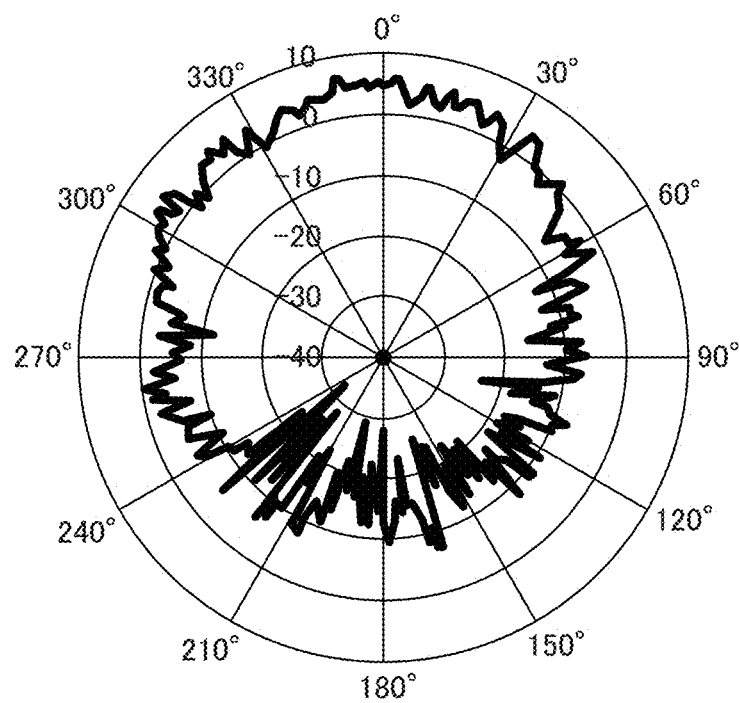

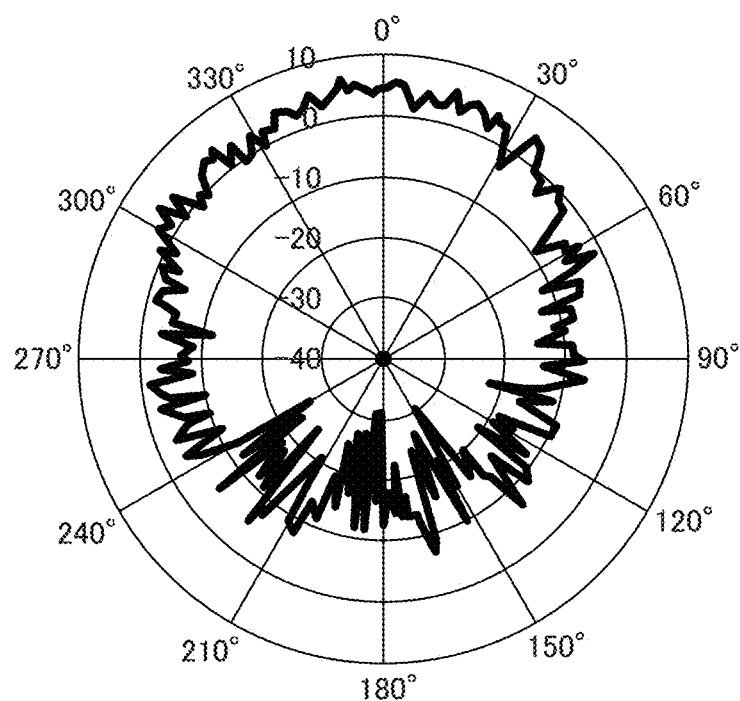

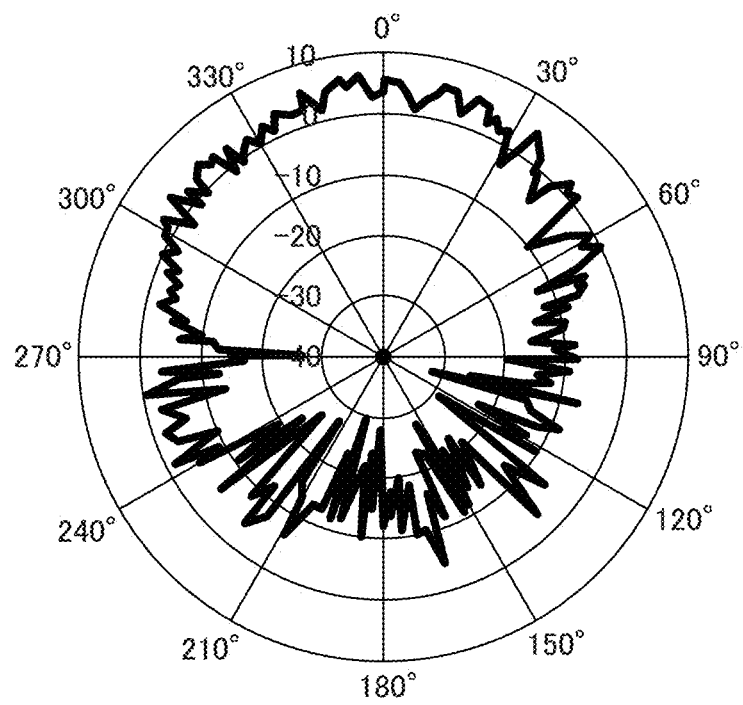

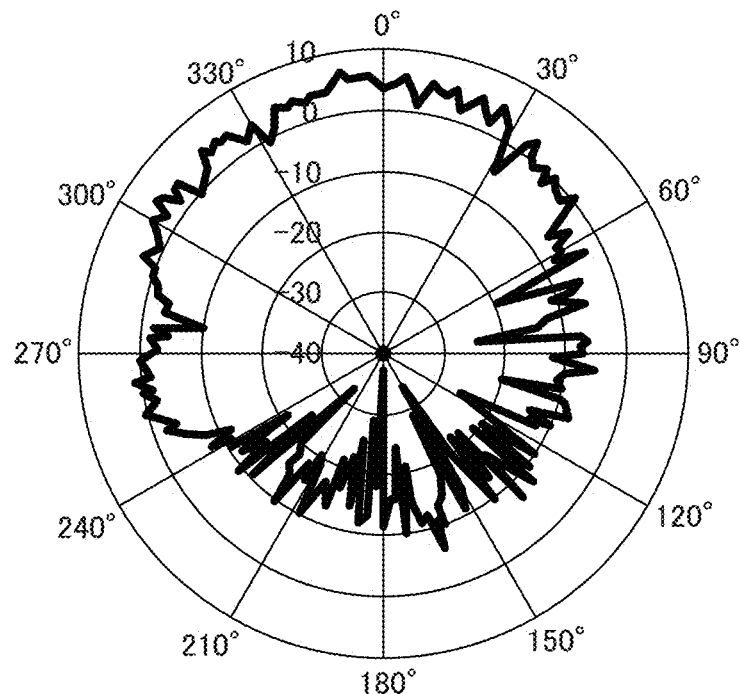

VEHICLE ANTENNA DEVICE

CROSS-REFERENCE TO RELATED APPLICATION

This application is a Continuation of International Application No. PCT/JP2022/035786, filed Sep. 26, 2022, which claims priority to Japanese Patent Application No. 2021-159730 filed Sep. 29, 2021. Each of the above applications is hereby expressly incorporated by reference, in its entirety, into the present application.

BACKGROUND

Technical Field

The present disclosure relates to a vehicle antenna device.

Related Art

Recently, sometimes various electronic devices are attached to an interior side of a vehicle by being fixed to an upper portion of a windshield of a vehicle by a bracket. These electronic devices include, for example, various sensors including visible light cameras and millimeter wave radars.

Furthermore, to accompany recent developments in vehicle driving assistance control, tests are being performed for high speed and high capacity communication using radio waves in high frequency bands, including GHz bands. In particular, in accordance with improved levels of autonomous-driving, a communication system employed in Vehicle to Everything (V2X), such as vehicle-to-vehicle communication and roadside-to-vehicle communication, is gradually being implemented as a fifth-generation mobile communication system (5G) utilizing GHz frequency bands. Communication antennas for V2X are installed to vehicles in a V2X communication system, and these are sometimes disposed interior side of a vehicle in the vicinity of a windshield (see International Publication (WO) No. 2019/208453). Such cases sometimes result in the above-mentioned electronic device and communication antenna both being attached at an upper edge portion of the windshield.

There is accordingly a concern that radio wave interference might occur between a communication antenna and an electronic device when the communication antenna and the electronic device are disposed with a short distance therebetween at the windshield vicinity. Moreover, there is also a concern that either the communication antenna or the electronic device might impede the field of view of a driver when, in order to avoid the occurrence of interference, the communication antenna and the electronic device are disposed with a long distance therebetween in the up-down direction of the windshield. In order to solve these issues there is a need to dispose the communication antenna and the electronic device in the windshield vicinity while maintaining a certain separation in the vehicle width direction between the pair.

However, an onboard unit covered with a cover member fixed by a bracket and installed with an electronic device such as an imaging device or the like is typically mounted on an interior side of a vehicle at a vehicle width central portion of an upper portion of the windshield. This means that were a communication antenna to be separated from the electronic device by a prescribed distance in the vehicle width direction, then the communication antenna would be disposed displaced to one or other side of the vehicle width central portion in the vehicle width direction. This results in an issue in that antenna gain for the communication antenna tends to drop in a prescribed direction for radio waves of the frequency band for transmitting and receiving, making it difficult to obtain desired directionality thereof.

In consideration of the above circumstances, an object of the present disclosure is to obtain a vehicle antenna device capable of suppressing a drop in antenna gain of a prescribed direction and having excellent directionality for a communication antenna provided to a vehicle window glass so as to be separated in the vehicle width direction from an electronic device provided at a vehicle width direction central portion at or near an upper portion of the vehicle window glass.

SUMMARY

A vehicle antenna device according to the present disclosure includes a vehicle window glass attachable to a vehicle so as to configure at least one of a windshield or a rear glass, an electronic device provided at a vehicle width direction central portion at or near a vehicle up-down direction upper portion of the vehicle window glass when the vehicle window glass has been attached to the vehicle; and an antenna that is provided with a radiation conductor including a radiation surface for transmitting and receiving radio waves of a prescribed frequency band, the radiation conductor being attached to the upper portion of a principal surface at an interior side of the vehicle window glass such that a normal to the radiation surface passes through the principal surface. A vehicle width direction central position of the antenna is separated, by a prescribed distance in the vehicle width direction, from a reference position that is at a vehicle width direction center of the electronic device provided at the central portion at or near the upper portion of the vehicle window glass. When the vehicle window glass attached to the vehicle is viewed along the vehicle up-down direction, the radiation surface is in a state inclined with respect to the vehicle width direction and a vehicle front-rear direction such that a second end portion of the radiation surface, which is an end portion on an opposite side from a reference position side of the radiation surface, is positioned further toward a lower edge side of the vehicle window glass than a first end portion, which is an end portion on the reference position side of the radiation surface.

The vehicle antenna device according to the present disclosure is able to suppress a drop in antenna gain in a prescribed direction and exhibits excellent directionality for a communication antenna that is provided to a vehicle window glass so as to be separated in a vehicle width direction from an electronic device provided at a vehicle width direction central portion at or near an upper portion of the vehicle window glass.

BRIEF DESCRIPTION OF THE DRAWINGS

FIG. 8 is a diagram illustrating a measurement result of directionality of a vehicle antenna device of Example 1, having a distance WP of 200 mm and an inclination angle θH of 20°.

FIG. 9 is a diagram illustrating a measurement result of directionality of a vehicle antenna device of Example 2, having a distance WP of 200 mm and an inclination angle θH of 30°.

FIG. 10 is a diagram illustrating a measurement result of directionality of a vehicle antenna device of Example 3, having a distance WP of 200 mm and an inclination angle θH of 40°.

FIG. 11 is a diagram illustrating a measurement result of directionality of a vehicle antenna device of Example 4, having a distance WP of 200 mm and an inclination angle θH of 0°.

FIG. 12 is a diagram illustrating a measurement result of directionality of a vehicle antenna device of Example 5, having a distance WP of 360 mm and an inclination angle θH of 25°.

FIG. 13 is a diagram illustrating a measurement result of directionality of a vehicle antenna device of Example 6, having a distance WP of 360 mm and an inclination angle θH of 40°.

FIG. 14 is a diagram illustrating a measurement result of directionality of a vehicle antenna device of Example 7, having a distance WP of 360 mm and an inclination angle θH of 55°.

FIG. 15 is a diagram illustrating a measurement result of directionality of a vehicle antenna device of Example 8, having a distance WP of 360 mm and an inclination angle θH of 0°.

DETAILED DESCRIPTION

Figure 1:
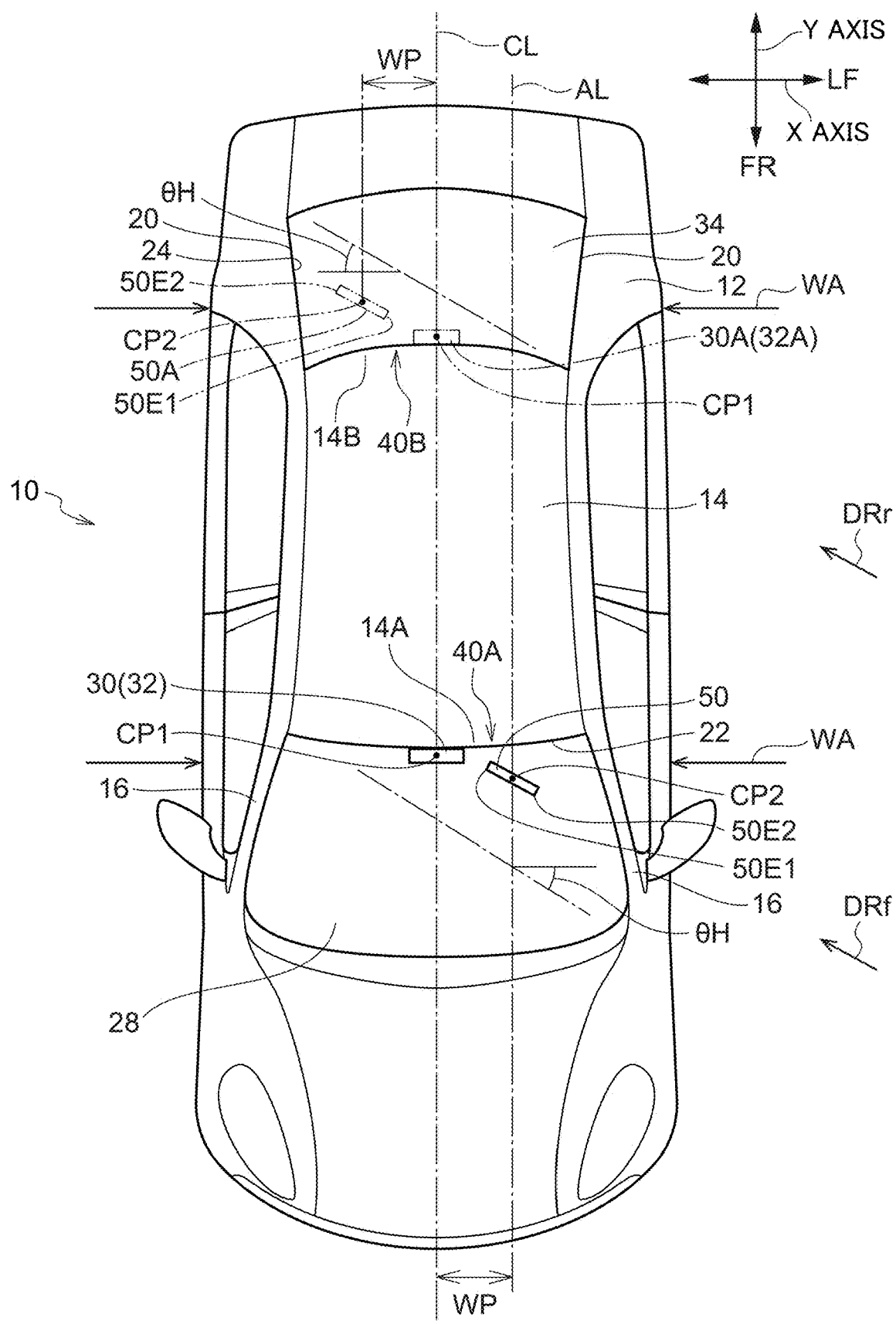
FIG. 1 is a plan view as viewed along a vehicle vertical direction of vehicle applied with a vehicle antenna device according to an exemplary embodiment of the present disclosure.

Description follows regarding a vehicle antenna device 40A according to an exemplary embodiment of the present disclosure, with reference to the appended drawings. Note that in the following description the vehicle antenna device 40A is simply called "antenna device 40A". As described below, the antenna device 40A of the present exemplary embodiment is provided to a vehicle 10. As appropriately indicated in the drawings, an X axis is parallel to a vehicle width direction of the vehicle 10, a Y axis is parallel to a vehicle front-rear direction, and a Z axis is parallel to a vehicle up-down direction and is also called a "vertical direction". Furthermore, arrow FR indicates forward in the vehicle front-rear direction, an arrow UP indicates upward in the vehicle up-down direction, and an arrow LF indicates left in the vehicle width direction. An XY plane is a plane passing through the X axis and the Y axis, and is also called a "horizontal plane". Namely, in the following description the vehicle 10 is positioned on a horizontal plane, with the vehicle up-down direction aligned with the vertical direction, with the XY plane aligned with a horizontal plane, and with the vertical direction corresponding to a normal direction with respect to the horizontal plane. Furthermore, an XZ plane is a plane passing through the X axis and the Z axis, and a YZ plane is a plane passing through the Y axis and the Z axis.

The vehicle 10 according to the present exemplary embodiment includes a vehicle body 12 containing a metal body, as illustrated in FIG. 1. This metal body includes, for example, a roof section 14, A-pillars (front pillars) 16, and C-pillars (rear pillars) 20. The roof section 14 is a location configuring an upper section of the vehicle body 12.

Front edge portions (flanges) 14A of the roof section 14 are respectively connected to upper end portions (rear end portions) of the left and right pair of A-pillars 16. The left and right A-pillars 16 are inclined with respect to the Y axis and the Z axis in side view of the vehicle body 12 (looking along the X axis direction) such that a lower end portion is positioned further forward than a top end portion thereof. Furthermore, the left and right A-pillars 16 are inclined with respect to the X axis and the Y axis when viewed along the vertical direction (Z axis direction) such that a lower end portion (front end portion) is positioned further toward a vehicle width direction outside than the upper end portion (rear end portion) thereof.

The upper end portions (front end portions) of the left-right pair of C-pillars 20 are respectively connected to the rear edge portion (flange) 14B of the roof section 14. The left and right C-pillars 20 are inclined with respect to the Y axis and the Z axis in side view of the vehicle body 12 (viewed along the X axis direction) such that the lower end portions (rear end portions) thereof are positioned further rearward than the upper end portions (front end portions) thereof. Furthermore, the left and right C-pillars 20 are inclined with respect to the X axis and the Y axis when viewed along the vertical direction (Z axis direction) such that lower end portions (rear end portions) thereof are positioned further toward a vehicle width direction outside than the upper end portions (front end portions) thereof.

Figure 2:
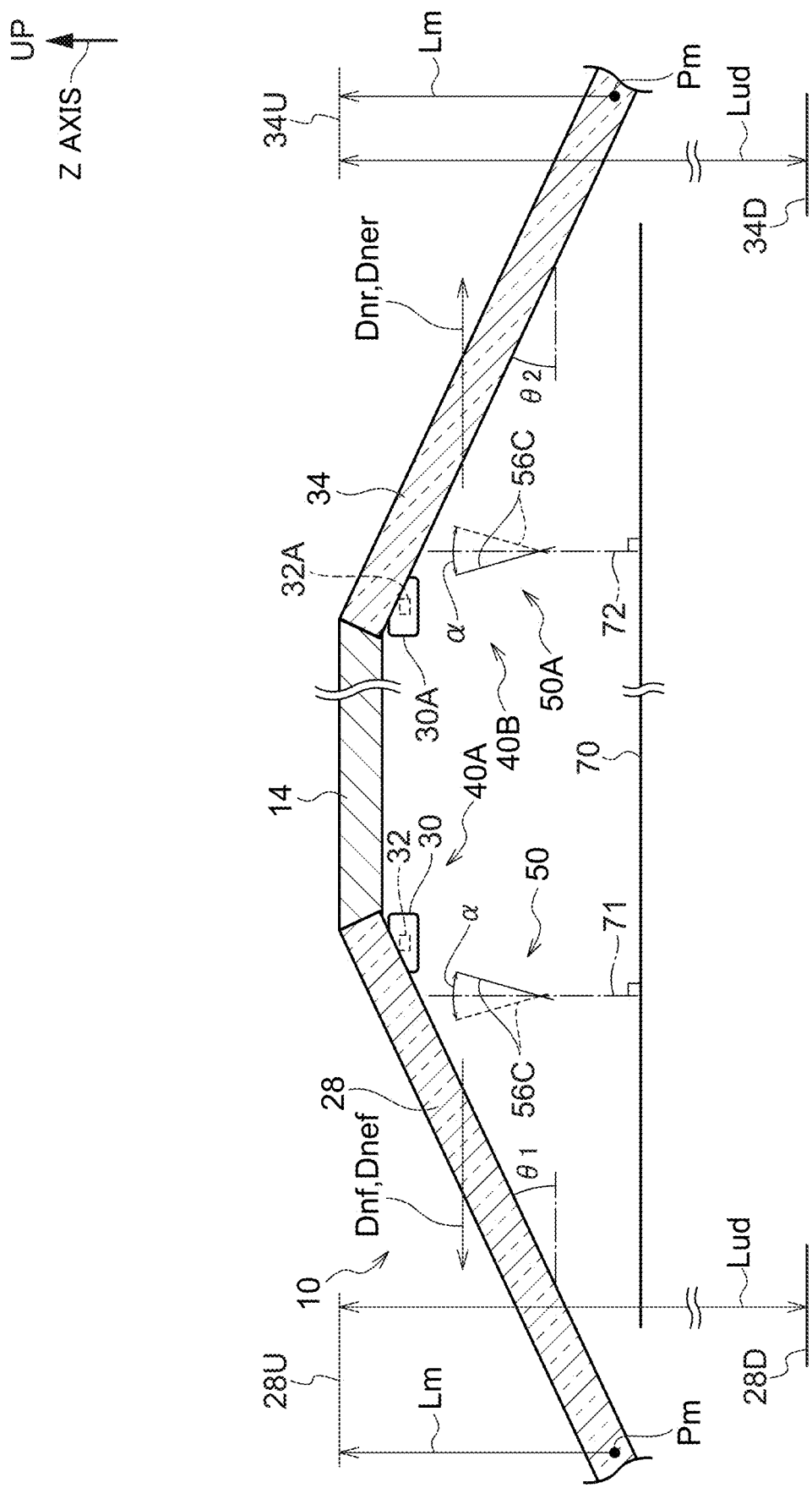
FIG. 2 is a schematic side view of a vehicle illustrating a cross-section of a roof section, a windshield, and a rear glass, when a front section of the vehicle is viewed along arrow DRf of FIG. 1 and a rear section of the vehicle is viewed along arrow DRf of FIG. 1.
Figure 4:
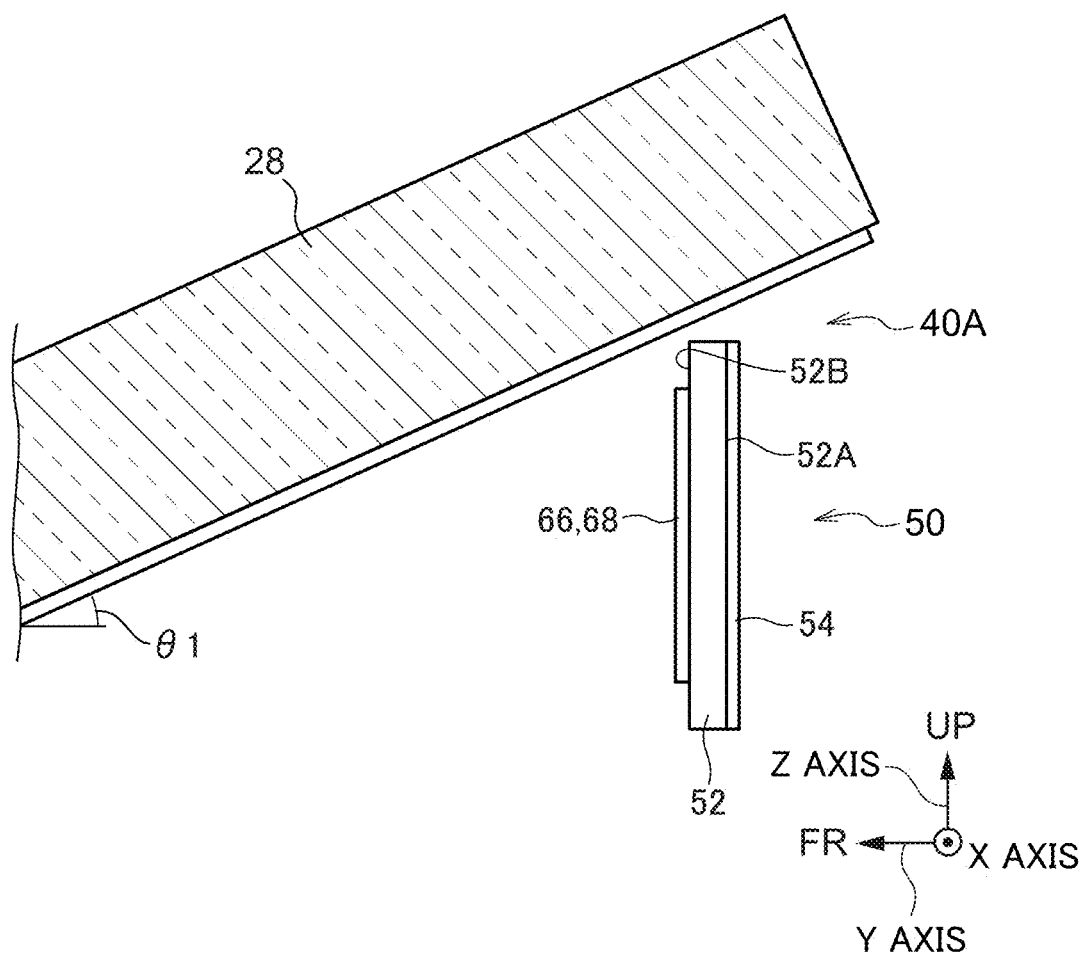
FIG. 4 is a side view of a vehicle antenna device illustrated in a cross-sectional view of a windshield.
Figure 5:
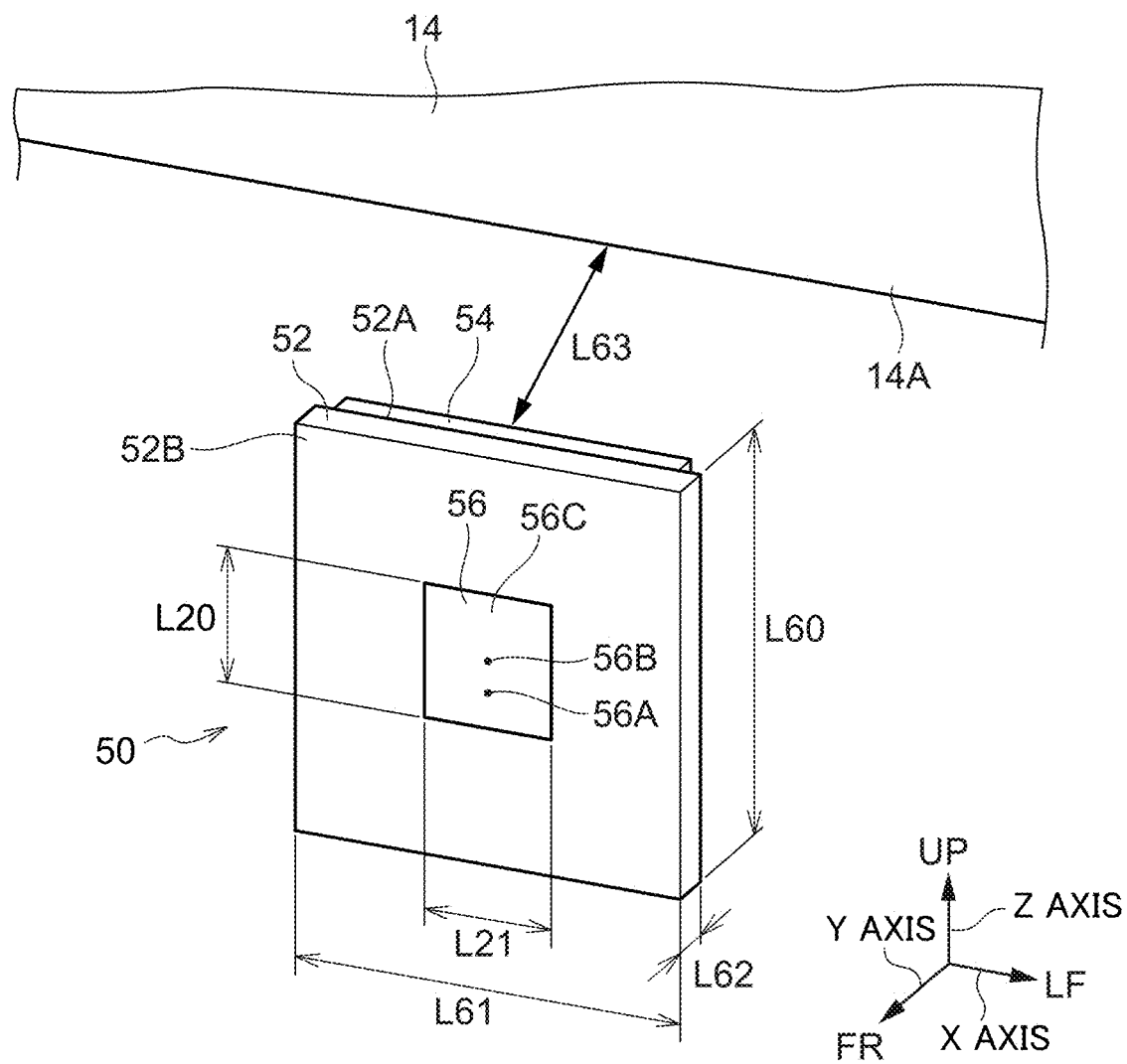
FIG. 5 is a perspective view of part of a vehicle antenna device and a front edge portion of a roof section.

A substantially square shaped forward opening 22 is formed in a front section of the vehicle body 12. An upper edge portion of the forward opening 22 is adjacent to the front edge portion 14A of the roof section 14, and left and right side edge portions of the forward opening 22 are adjacent to the left and right A-pillars 16. A windshield (vehicle window glass) 28 is fitted to the forward opening 22, and peripheral edge portions of the windshield 28 are fixed to peripheral edge portions of the forward opening 22 with an adhesive such as a urethane resin or the like. As illustrated in FIG. 2 and FIG. 4, the windshield 28 is, in side view, inclined at an angle θ1 with respect to an XY plane 70 corresponding to a horizontal plane, such that a lower end portion thereof is positioned further forward than the upper end portion thereof. The windshield 28 is one of the configuration elements of the antenna device 40A.

A substantially square shaped rearward opening 24 is formed at a rear section of the vehicle body 12. An upper edge portion of the rearward opening 24 is adjacent to the rear edge portion 14B of the roof section 14, and left and right side edge portions of the rearward opening 24 are adjacent to the left and right C-pillars 20. A rear glass (vehicle window glass) 34 is fitted to the rearward opening 24, with peripheral edge portions of the rear glass 34 fixed to peripheral edge portions of the rearward opening 24 with an adhesive such as a urethane resin or the like. As illustrated in FIG. 2, the rear glass 34 is, in side view, inclined at an angle θ2 with respect to the XY plane 70 corresponding to a horizontal plane such that a lower end portion thereof is positioned further rearward than an upper end portion thereof. Note that the rear glass 34 is not limited to an example attached to the vehicle body 12 as illustrated in FIG. 1, and may be attached to a back door made from resin and including (non-illustrated) metal reinforcement so as to cover an opening formed in the back door.

As illustrated in FIG. 1 and FIG. 2, a hollow box shaped case 30 is provided at a vehicle width direction central portion of a vehicle up-down direction upper portion of a principal surface (rear face) at the interior side of the windshield 28 so as to oppose the principal surface. The case 30 may be directly attached to the principal surface of the windshield 28 using adhesive or the like, or may be attached using a (non-illustrated) bracket fixed to the vehicle body 12 and the case 30. Moreover, a spacer fixed to the case 30 may be attached to the principal surface of the windshield 28 using adhesive or the like. One or plural electronic devices 32 may be housed inside the case 30. Such electronic device(s) 32 include, for example, a visible light camera, a millimeter wave radar, and a lane sensor. Note that the electronic devices 32 may be fixed to the windshield 28 interior side of the vehicle, and the periphery of the electronic devices 32 is not necessarily always covered by a case 30.

As illustrated in FIG. 2, Lud denotes a vertical direction distance between an upper edge 28U and a lower edge 28D of the windshield 28 and a vertical direction distance between an upper edge 34U and a lower edge 34D of the rear glass 34 when the vehicle window glasses (the windshield 28, the rear glass 34) have been fixed to the vehicle 10. Furthermore, Pm denotes a prescribed location of a vertical direction intermediate portion of the vehicle window glass. Furthermore, Lm denotes a vertical direction distance between the upper edge 28U, 34U of the vehicle window glass and the location Pm when the vehicle window glass has been fixed to the vehicle 10. An area between the upper edge 28U, 34U of the vehicle window glass and the location Pm corresponds to an "upper portion of vehicle window glass" according to the present exemplary embodiment, wherein Lm/Lud=0.3.

As illustrated in FIG. 1, a vehicle width direction central point of the electronic device 32 when the vehicle 10 is viewed along the vertical direction is defined as being a reference position CP1. Note that reference symbol CL in FIG. 1 indicates a center line of the vehicle 10 passing along the Y axis direction (vehicle progression direction) through the reference position CP1 when the vehicle 10 is viewed in plan view. Furthermore, in the present specification a "reference position of the electronic device 32" is taken as matching the reference position CP1. However, even in cases in which a reference position that is at a vehicle width direction center of the electronic device 32 is slightly displaced in the vehicle width direction and does not exactly align with the reference position CP1 when viewed along the vertical direction, the reference position CP1 is taken as being the reference position of the electronic device 32 in the present specification.

Furthermore, "the electronic device 32 is provided at a vehicle width direction central portion of a principal surface at an interior side of the vehicle window glass (the windshield 28, the rear glass 34)" in the present specification means that at least a portion of the electronic device 32 (case 30) is positioned on the center line CL when viewed along the vertical direction.

Furthermore, as illustrated in FIG. 1 and FIG. 4, a communication antenna 50 that is one configuration element of the antenna device 40A is attached to a vehicle up-down direction upper portion of the principal surface of the windshield 28 through a bracket or the like, omitted in the drawings. The communication antenna 50 of the present exemplary embodiment is, for example, a vertical polarized antenna having an antenna gain higher when transmitting and receiving vertically polarized waves than when transmitting and receiving horizontally polarized waves. However, the communication antenna 50 may be a horizontal polarized antenna having an antenna gain higher when transmitting and receiving horizontal polarized waves than when transmitting and receiving vertical polarized waves, and may also be an antenna having antenna gain for horizontal polarized waves at the same level as the antenna gain for vertical polarized waves. In the following, a V2X antenna that will be described is in particular an antenna capable of transmitting and receiving with vertical polarized waves, and is able to utilize radio waves in a 5.8 GHz band or radio waves in a 5.9 GHz band.

The greater a distance by which the electronic device 32 and the antenna 50 are separated is, the more mutual interference between radio waves thereof can be suppressed, and the more isolation can be secured. In particular, the level of interference changes according to a shortest distance between portions transmitting radio waves in the electronic device 32 and the antenna 50. The shortest distance may be 50 mm or greater, is preferably 70 mm or greater, is more preferably 100 mm or greater, is further more preferably 150 mm or greater, and is especially preferably 180 mm or greater. However, if the shortest distance is too great a separation then this leads to a concern that a wide range of the field of view of an occupant might be blocked, and so the shortest distance may be appropriately set so as to be sufficient to achieve appropriate isolation. Note that when the shortest distance is too great a separation then the antenna 50 is in proximity to the A-pillar 16, leading to a concern that the antenna gain of radio waves of a prescribed frequency might drop due to the conductor of the A-pillar. The distance of the antenna 50 from the A-pillar 16 should accordingly be 20 mm or greater, is preferably 30 mm or greater, is more preferably 50 mm or greater, is further more preferably 80 mm or greater, and is especially preferably 100 mm or greater.

Next, description follows regarding the communication antenna 50 (hereafter referred to as "antenna 50") of the vehicle antenna device 40A according to the present exemplary embodiment. As illustrated in FIG. 3 to FIG. 7, the antenna 50 of the present exemplary embodiment includes a dielectric substrate 52, a conductor plate 54, a radiation plate (radiation conductor) 56, a feeding portion 60, and a connecting conductor 62. Note that, as described later, the antenna 50 may include a first element 66 and a second element 68. The antenna 50 of the present exemplary embodiment is a patch antenna (micro-strip antenna). The antenna 50 of the present exemplary embodiment may, for example, be utilizable as a V2X antenna as described above, and the antenna 50 may be configured so as to be capable of transmitting and receiving radio waves of a band different therefrom.

The dielectric substrate 52 is a plate shaped or film shaped dielectric layer with a dielectric body as a main component thereof. Note that "plate shaped or film shaped" as employed here may include a three dimension profile and includes for example a convex shape, a concave shape, or a wave shape. Similar applies to "plate shaped or film shaped" as employed for the conductor plate 54, the radiation plate 56, the first element 66, and the second element 68. However, the conductor plate 54, the radiation plate 56, the first element 66, and the second element 68 are preferably planar shaped (two-dimensionally shaped). The characteristics of antenna gain of the antenna 50 are readily predicted when these members are planar shaped. As is apparent from FIG. 5 and FIG. 6, the dielectric substrate 52 is a cuboidal body, and a face-on profile thereof is a rectangular shape having a larger X axis direction dimension than Z axis direction dimension. However, the dielectric substrate 52 may be square shape in which the X axis direction dimension and the Z axis direction dimension are the same as each other. The dielectric substrate 52 includes a surface 52A that is a face on one side in the thickness direction, and a surface 52B that is a face on the other side. The surface 52A and the surface 52B are flat faces parallel to each other. The dielectric substrate 52 may, for example, be configured by a glass epoxy substrate or the like, and may be configured by a dielectric sheet. The material of a dielectric body contained in the dielectric substrate 52 may, for example, be glass such as quartz glass, ceramic, a fluororesin such as polytetrafluoroethylene or the like, a liquid crystal polymer, or a cycloolefin polymer. However the material of the dielectric body may be a different material to these.

The conductor plate 54 is provided to the surface 52A of the dielectric substrate 52. The conductor plate 54 functions as a ground of the antenna 50. The conductor plate 54 is a plate shaped or film shaped conductor. The two thickness direction faces of the conductor plate 54 are parallel to each other. Examples of the material configuring the conductor plate 54 include, for example, silver or copper, however a material other than silver or copper may be employed. The face-on profile of the illustrated conductor plate 54 is a small square shape, with a smaller X axis direction dimension than that of the dielectric substrate 52. However, the face-on profile of the conductor plate 54 may be a shape other than a square shape. For example, the face-on profile of the conductor plate 54 may be a rectangular shape, a polygonal shape, or a circular shape.

The radiation plate 56 is provided on the surface 52B of the dielectric substrate 52. The radiation plate 56 is a plate shaped or film shaped conductor, with a surface area that is smaller than that of the conductor plate 54. The radiation plate 56 is a planar shaped layer, and a radiation surface 56C that is the front face thereof is a flat plane. As illustrated in FIG. 2, a normal direction Dnf to the radiation surface 56C extends forward from the radiation surface 56C and passes through the windshield 28. Note that the normal direction Dnf of FIG. 2 indicates the normal direction when an inclination angle α, described later, is 0°. The radiation plate 56 functions as a radiation element of the antenna 50. Examples of the material configuring the radiation plate 56 include, for example, silver or copper, however a material other than silver or copper may be employed. The face-on profile of the illustrated radiation plate 56 is a square shape. However, the face-on profile of the radiation plate 56 may be a shape other than a square shape. For example, the face-on profile of the radiation plate 56 may be a polygonal shape, or a circular shape.

The feeding portion 60 is a location where electricity is fed either by a contact or non-contact method, and is a location either connected to one end of a feed line, omitted in the drawings, or in the vicinity thereof. Specific examples of the feed line include a coaxial cable, a microstrip line, a coplanar feed line, or the like. The other end of the feed line is connected to a communication device for communication with outside the vehicle using the antenna 50.

Figure 3:
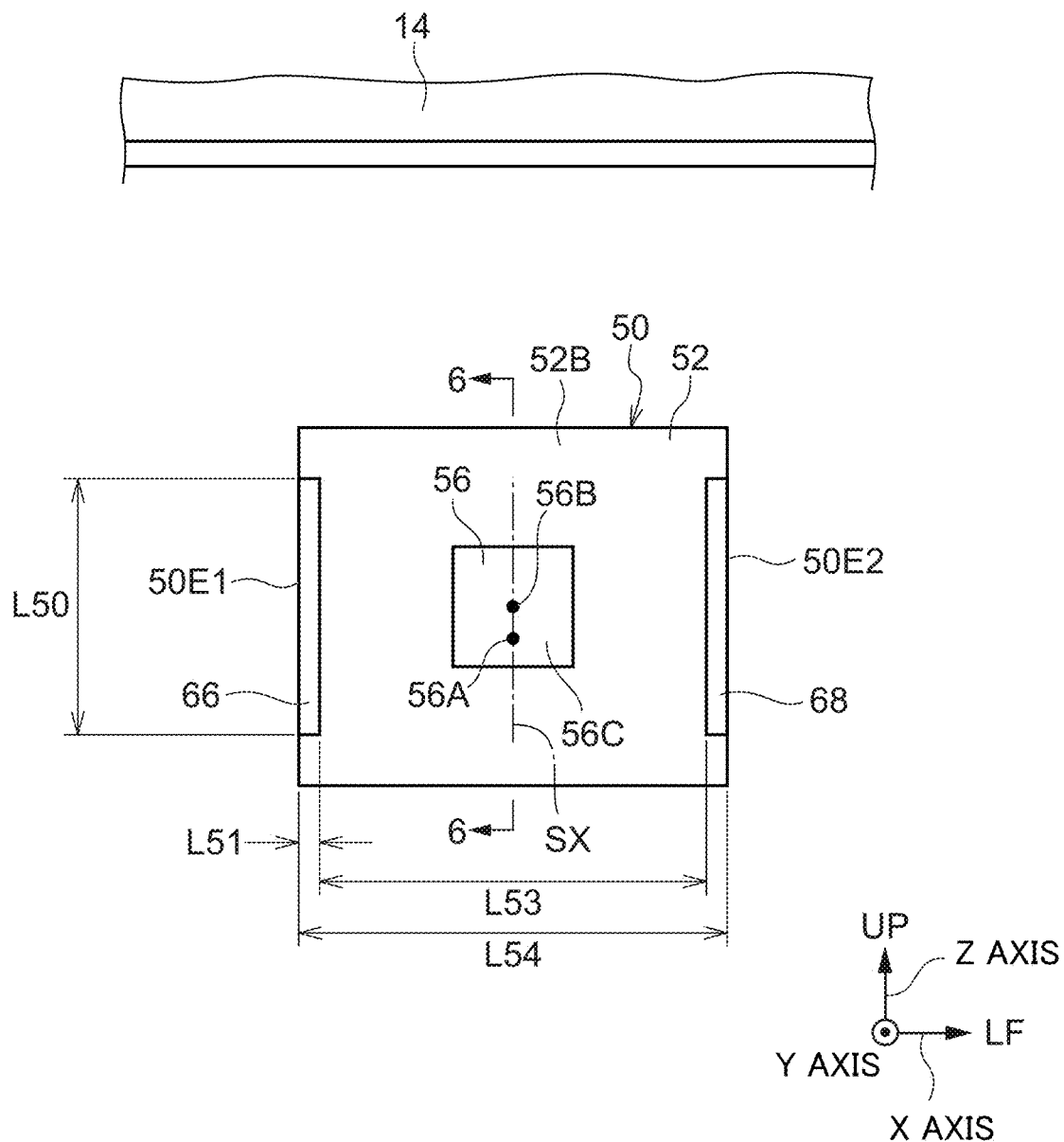
FIG. 3 is a front view of a vehicle antenna device and a roof section.
Figure 6:
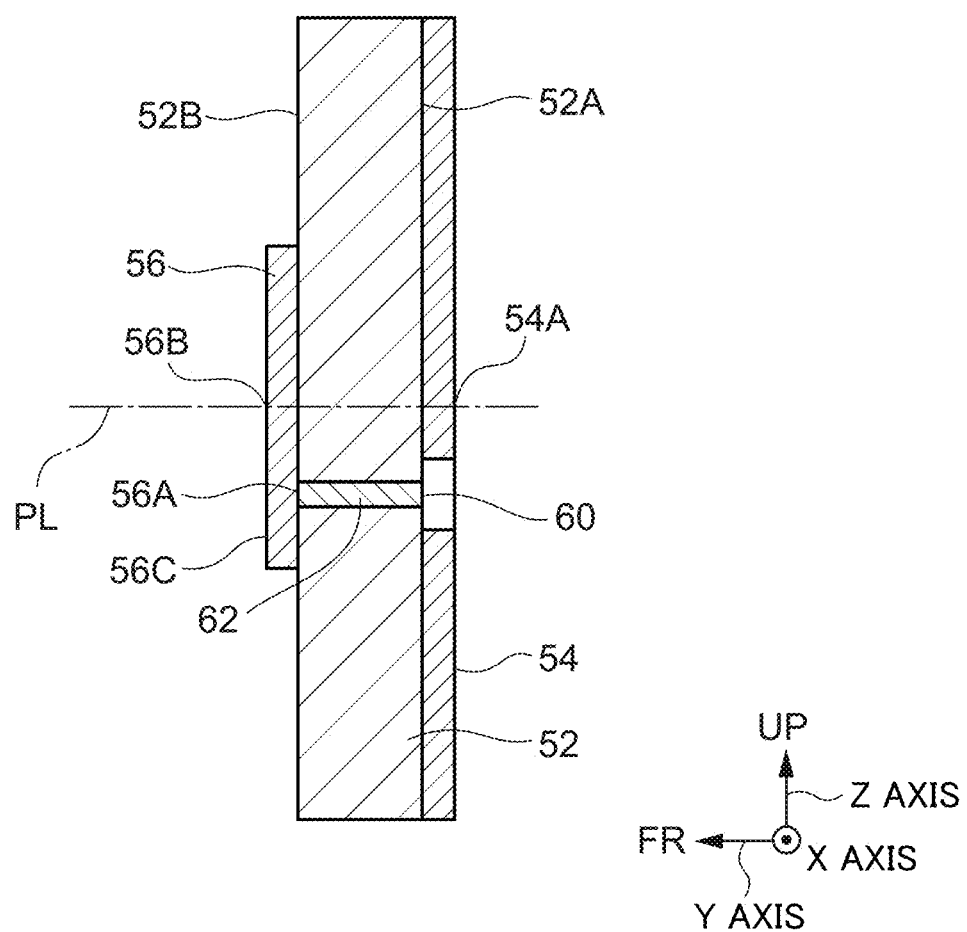
FIG. 6 is a cross-section of a vehicle antenna device taken along arrow line 6-6 of FIG. 3.

The connecting conductor 62 of the present exemplary embodiment is provided inside a through hole penetrating in the thickness direction through the dielectric substrate 52, which is the medium between the conductor plate 54 and the radiation plate 56. The connecting conductor 62 is, for example, a core wire or a conductor pin of a coaxial cable, however the connecting conductor 62 is not limited thereto. One end of the connecting conductor 62 is connected to the feeding portion 60, and the other end thereof is connected to a connection point 56A of the radiation plate 56. The one end of the connecting conductor 62 does not contact the conductor plate 54. As illustrated in FIG. 3, the connection point 56A is separated from a centroid 56B of the radiation plate 56 in front view. Note that the connecting conductor 62 when the medium between the conductor plate 54 and the radiation plate 56 includes a void (air) is, for example, a core wire or a conductor pin of a coaxial cable, however the connecting conductor 62 is not limited thereto. As illustrated in FIG. 6, the centroid 56B of the radiation plate 56 and a centroid 54A of the conductor plate 54 are positioned on a straight line PL passing through the radiation plate 56 in the thickness direction thereof. Adopting such a configuration improves the antenna gain of the antenna 50 in a direction from the conductor plate 54 side through toward the radiation plate 56 side.

Figure 7:
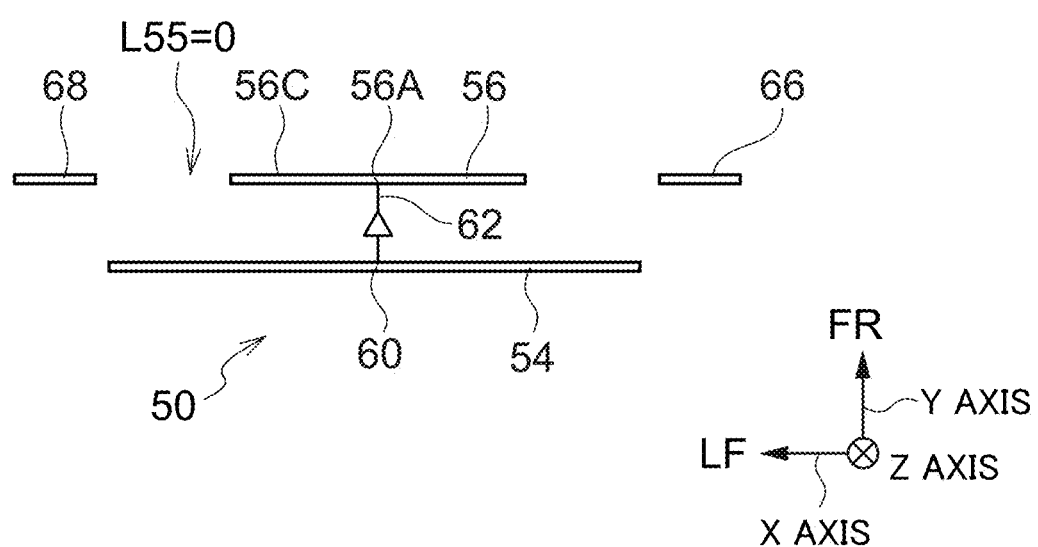
FIG. 7 is a schematic plan view of a vehicle antenna device.

As illustrated in FIG. 3 and FIG. 7, the antenna 50 may be further provided with at least one out of the first element 66 or the second element 68, which are parasitic conductors. In such cases the first element 66 and the second element are provided on the surface 52B of the dielectric substrate 52 so as to be separated from each other in the vehicle width direction (horizontal direction). However, the at least one out of the first element 66 or the second element 68 may be disposed separated further toward the Y axis arrow FR side than the surface 52B of the dielectric substrate 52, and may be disposed separated further toward the opposite side of the Y axis arrow FR side than the surface 52B. The radiation plate 56 is positioned between the first element 66 and the second element 68 when the antenna 50 is viewed along the thickness direction of the dielectric substrate 52. Furthermore, as illustrated in FIG. 7, the radiation plate 56 (the radiation surface 56C thereof), the first element 66, and the second element 68 are all positioned in the same plane when the antenna 50 is viewed along the Z axis.

Moreover, as illustrated in FIG. 2, the antenna 50 is disposed such that each normal direction Dnef extending forward from the first element 66 and the second element 68 passes through the windshield 28. Note that the normal direction Dnef of FIG. 2 indicates the normal direction when the inclination angle α, described later, is 0°. Furthermore, as illustrated in FIG. 3, the antenna 50 is configured such that, in front view, the first element 66 and the second element 68 are symmetrical to each other in relation to an axis of symmetry SX passing through the connection point 56A, and is configured such that the radiation plate 56 is symmetrical with respect to the axis of symmetry SX. Providing the first element 66 and the second element 68 to the antenna 50 in such a manner improves the vehicle width direction antenna gain of the antenna 50. Note that the vehicle front-rear direction antenna gain of the antenna 50 tends to be large and the vehicle width direction antenna gain of the antenna 50 tends to be relatively small in cases in which the first element 66 and the second element 68 are not provided.

The surface areas of the first element 66 and the second element 68 may be smaller than the surface area of the conductor plate 54 and may be smaller than the surface area of the radiation plate 56. However, the magnitude relationship between the surface areas of the first element 66, the second element 68, the conductor plate 54, and the radiation plate 56 is not limited thereto. For example, as long as the antenna 50 satisfies a desired directionality, the surface area of at least one of the first element 66 or the second element 68 may be larger than the surface area of the radiation plate 56.

Examples of the material configuring the first element 66 and the second element 68 include, for example, silver or copper, however a material other than silver or copper may be employed. Moreover, although the face-on profiles of the illustrated first element 66 and second element 68 are rectangular, they may have a different shape to rectangular. For example, the face-on profile of the first element 66 and the second element 68 may be a square, a triangle, a pentagon or higher order polygonal shape, or may be a circular shape.

In particular, in cases in which at least one of the first element 66 or the second element 68 is provided, the antenna gain in the vehicle forward direction of the antenna 50 (that is disposed in the vicinity of the windshield) is appropriately distributed to antenna gain in the vehicle width direction. Furthermore, cases in which both the first element 66 and the second element 68 are provided facilitate the antenna 50 easily obtaining appropriate antenna gain in both the vehicle forward direction and the vehicle width directions.

In the present specification, a 90° direction in simulation results of the antenna gain of the antenna 50 is the vehicle width direction right side (see FIG. 1), and a 270° direction is the vehicle width direction left side. Note that a 0° direction in simulation results of the antenna gain of the antenna 50 in the present specification is a front side (progress direction) in the vehicle front-rear direction.

Consider, as illustrated in FIG. 7, a case in which the antenna 50 is configured such that the radiation surface 56C of the radiation plate 56, the first element 66, and the second element 68 are positioned in the same plane. As illustrated in FIG. 1 and FIG. 3, a right end portion of the antenna 50 when the vehicle 10 is viewed along the Y axis direction or the Z axis direction is defined as being a first end portion 50E1, and a left end portion of the antenna 50 is defined as being a second end portion 50E2. Namely, the right end portion of the first element 66 is defined as being the first end portion 50E1 and the left end portion of the second element 68 is defined as being the second end portion 50E2.

The antenna 50 is attached to an upper portion of the principal surface of the interior side of the windshield 28 in the particular inclined state illustrated in FIG. 1. The particular inclined state of the antenna 50 is a state in which the second end portion 50E2 is positioned further toward the lower edge side of the windshield 28 than the first end portion 50E1 when viewed along the vertical direction (Z axis direction) of the vehicle 10. Namely, the particular inclined state is an inclined state in which the radiation surface 56C of the radiation plate 56 is inclined (together with the first element 66 and the second element 68) with respect to the X axis direction and Y axis direction. Namely, the second end portion 50E2 of the antenna 50 that is in the particular inclined state is positioned further toward the front side in the vehicle front-rear direction than the first end portion 50E1. An angle (inclination angle) formed between the antenna 50 that is in the particular inclined state and the vehicle width direction (X axis) in plan view is denoted by $\theta H(°)$ ($0°<\theta H<90°$). Note that in order to improve the antenna gain of the antenna 50, preferably $15°\leq \theta H \leq 60°$, and more preferably $20°\leq \theta H \leq 55°$.

Furthermore, as illustrated in FIG. 1, a distance in the vehicle width direction from the center line CL to a central position CP2 of the antenna 50 is denoted by WP (mm). Note that reference sign AL illustrated in FIG. 1 indicates an imaginary straight line passing in the Y axis direction through the central position CP2 when viewed along the vertical direction. In the present specification, the central position CP2 of the antenna 50 is a geometric center of the antenna 50 and, for example, corresponds to the centroid of the radiation plate 56. Furthermore, a vehicle width at the same front-rear direction position as the central position CP2 of the vehicle 10 is denoted by WA (mm). The following Equation (1a) is satisfied in the vehicle 10 and the antenna device 40A (the windshield 28, the antenna 50) of the present exemplary embodiment.

$$(WA/2) \times 0.2 \leq WP \leq (WA/2) \times 0.8 \qquad \text{Equation (1a)}$$

For example, in cases in which WA=1900 mm, the antenna device 40A may be set such that 190 mm≤WP≤760 mm. However, WA=1900 mm is merely an example thereof, and depending on the width of WA, WP may be less than 190 mm, of may be greater than 760 mm.

Moreover, in the vehicle 10 and the antenna device 40A of the present exemplary embodiment, the following Equation (1b) is preferably satisfied, and the following Equation (1c) is more preferably satisfied.

$$(WA/2) \times 0.2 \leq WP \leq (WA/2) \times 0.7 \qquad \text{Equation (1b)}$$

$$(WA/2) \times 0.2 \leq WP \leq (WA/2) \times 0.6 \qquad \text{Equation (1c)}$$

Furthermore, in the vehicle 10 and the antenna device 40A of the present exemplary embodiment, the following Equation (2a) is satisfied between $\theta H$, WP, and WA.

Note that $\{WP/(WA/2)\times 100\}$ of Equation (2a) expresses a vehicle width direction relative position of the antenna 50 with respect to the vehicle width WA of the vehicle 10.

$$0.50 \leq \theta H/\{(WP/(WA/2))\times 100\} \leq 2.00 \qquad \text{Equation (2a)}$$

Moreover, the following Equation (2b) is preferably satisfied between $\theta H$, WP, and WA in the vehicle 10 and the antenna device 40A of the present exemplary embodiment, the following Equation (2c) is more preferably satisfied, the following Equation (2d) is further more preferably satisfied, and the following Equation (2e) is especially preferably satisfied.

$$0.60 \leq \theta H/\{(WP/(WA/2))\times 100\} \leq 1.95 \qquad \text{Equation (2b)}$$

$$0.65 \leq \theta H/\{(WP/(WA/2))\times 100\} \leq 1.90 \qquad \text{Equation (2c)}$$

$$0.80 \leq \theta H/\{(WP/(WA/2))\times 100\} \leq 1.50 \qquad \text{Equation (2d)}$$

$$0.85 \leq \theta H/\{(WP/(WA/2))\times 100\} \leq 1.25 \qquad \text{Equation (2e)}$$

Next, description follows regarding an angle of elevation and an angle of dip of the antenna 50. As illustrated in FIG. 2, the antenna 50 is appropriately installed such that an inclination angle $\alpha$ of the radiation surface 56C of the radiation plate 56 with respect to a vertical direction 71 does not fall outside ±15° when a front section of the vehicle 10 is viewed from the left side along the arrow DRf of FIG. 1. The arrow DRf of FIG. 1 is parallel to the width direction of the antenna 50 in plan view. Moreover, as illustrated by the solid line in FIG. 2, a value of the inclination angle α is + (plus) when the radiation surface 56C is positioned further rearward than the vertical direction 71. However, as illustrated by the dashed line in FIG. 2, a value of the inclination angle α is − (minus) when the radiation surface 56C is positioned further forward than the vertical direction 71. In other words, the angle of elevation formed between the normal direction of the radiation surface 56C of the radiation plate 56 and a horizontal plane when the inclination angle α exceeds 0° should be greater than 0° without exceeding +15°. Furthermore, the angle of dip formed between the normal direction of the radiation surface 56C of the radiation plate 56 and a horizontal plane when the inclination angle α is less than 0° should be smaller than 0° without being less than −15°. Note that in the present specification a magnitude of an angle of elevation is + (plus) and a magnitude of an angle of dip is − (minus).

In particular, in cases in which the antenna 50 satisfies a prescribed directionality in the horizontal plane, the antenna gain in the horizontal plane direction drops when the angle of elevation or the angle of dip of the radiation surface 56C becomes too large in magnitude and so when, for example, the antenna 50 is a V2X antenna, the radio wave transceiving efficiency along the horizontal plane falls. In this manner, if the inclination angle α of the radiation surface 56C of the radiation plate 56 falls outside ±15°, there is a concern regarding a loss of balance of the antenna gain in the antenna 50 in directions parallel to the XY plane 70.

Moreover, the inclination angle α of the radiation surface 56C of the radiation plate 56 of the antenna 50 preferably does not fall outside ±10°, more preferably does not fall outside ±5°, further more preferably does not fall outside ±1°, and is most preferably 0°. The antenna gain along horizontal plane directions can thereby be improved by making the absolute value of the inclination angle α small in this manner.

There is a need to not dispose a conductor such as the roof section 14 or the like forward of and in a normal direction to the radiation surface 56C of the radiation plate 56 of the antenna 50. Moreover, when φ(°) is an angle of elevation with reference to forward of and in a normal direction to the radiation surface 56C, a conductor (of the vehicle) should not be disposed in a range of φ from 0° to 20°, a conductor is preferably not disposed in a range up to 30°, and a conductor is more preferably not disposed in a range up to 45°. Similarly for cases in which φ(°) is negative (an angle of dip), a conductor (of the vehicle) should not be disposed in a range of φ from 0° to −20°, a conductor is preferably not disposed in a range down to −30°, and a conductor is more preferably not disposed in a range down to −45°. Note that examples of conductors that might possibly be disposed forward of and in a normal direction to the radiation surface 56C when the φ(°) is negative include, for example, electrical heating wires disposed on the windshield for heating the windshield and extending in an up-down direction at prescribed intervals in the vehicle width direction.

Description continues regarding Examples 1 to 3 and Examples 5 to 7, which are Working Examples of the above exemplary embodiment, while making comparisons to Examples 4 and 8 that are Comparative Examples. Note that dimensions of each portion of the antenna 50 and distances between the antenna 50 and peripheral members in the respective Examples 1 to 8, as indicated by reference signs L20, L21, L50, L51, L53, L54, L55, L60, L61, L62, L63 in FIG. 3 to FIG. 5, and FIG. 7, are as set out below. Note that the unit of each dimension is mm. Note that L55 is a distance in the Y axis direction between the first element 66 and the second element 68, and the radiation surface 56C. L63 is a shortest distance between the antenna 50 and a metal body of the vehicle body 12. Note that L63 of the present exemplary embodiment is the shortest distance between an upper edge portion of the conductor plate 54 and the front edge portion 14A of the roof section 14.

| | |
|---|---|
| L20: | 19 |
| L21: | 19 |
| L50: | 18 |
| L51: | 2 |
| L53: | 22 |
| L54: | 26 |
| L55: | 0 |
| L60: | 25 |
| L61: | 24 |
| L62: | 3 |
| L63: | 35 |

Moreover,

| | |
|---|---|
| θ1: | 22.5° |
| WA: | 1900 mm |
| WP: | 200 mm |
| α: | 0° |

WP and θH of Examples 1 to 4 are the following values.

Example 1

| | |
|---|---|
| WP: | 200 mm |
| θH: | 20° |

Example 2

| | |
|---|---|
| WP: | 200 mm |
| θH: | 30° |

Example 3

| | |
|---|---|
| WP: | 200 mm |
| θH: | 40° |

Example 4

| | |
|---|---|
| WP: | 200 mm |
| θH: | 0° |

FIG. 8 to FIG. 11 illustrate examples of measurement results of directionality of the antenna 50 for Examples 1 to 4. Each of the drawings illustrates a simulation result of antenna gain in respective directions in the XY plane 70. 90° indicates the vehicle width direction right side, 270° indicates the vehicle width direction left side, 0° indicates the front side in the vehicle front-rear direction, and 180° indicates the rear side in the vehicle front-rear direction. Similar applies in FIG. 12 to FIG. 15, described later.

As is apparent from FIG. 8 to FIG. 11, the antenna gain in a range of from 0° to +90° for the antenna 50 of Examples 1 to 3 having θH greater than 0° is better than the antenna gain in a range of from 0° to +90° of the antenna 50 of Example 4. In particular, in FIG. 8 to FIG. 11, although there is an area with a small amount of radio waves being radiated (NULL) in the vicinity of +75°, in FIG. 11 (Example 4) that is a Comparative Example, the NULL is significantly more pronounced than in FIG. 8 to FIG. 10 (Examples 1 to 3: Working Examples), and the area where radio wave transmitting and receiving is impeded is particularly broadened.

WP and θH of Examples 5 to 7 and Example 8 have the following values.

Example 5

| | |
|---|---|
| WP: | 360 mm |
| θH | 25° |

Example 6

| | |
|---|---|
| WP: | 360 mm |
| θH: | 40° |

Example 7

| | |
|---|---|
| WP: | 360 mm |
| θH: | 55° |

Example 8

| | |
|---|---|
| WP: | 360 mm |
| θH: | 0° |

FIG. 12 to FIG. 15 illustrate examples of measurement results of directionality of the antenna 50 of Examples 5 to 8. As is apparent from FIG. 12 to FIG. 15, antenna gain in a range of from 0° to +90° of the antenna 50 of Examples 5 to 7 having θH greater than 0° is better than the antenna gain in a range of from 0° to +90° of the antenna 50 of Example 8. In particular, in FIG. 12 to FIG. 14 (Examples 5 to 7: Working Examples) there is no noticeable NULL present in the range of from 0° to +90°, however there is a noticeable NULL present in the vicinity of +60° and in the vicinity of +85° in FIG. 14 (Example 8) that is a Comparative Example, confirming that there is a concern regarding radio wave transmitting and receiving being impeded at these angles.

As described above, in the antenna device 40A of the present exemplary embodiment, the antenna 50 is disposed at the left side of the electronic device 32. In such cases radio wave interference occurring between the electronic device 32 and the antenna device 40A when the θH is set to 0° tends to be a cause of a drop in antenna gain on the right side of the antenna device 40A. For example, an area (NULL) where the amount of radio wave radiation is small readily arises in a range of from 0° to +90°. However, as is apparent from the measurement results of directionality of the antenna 50 in Examples 1 to 3 and 5 to 7, when the θH is greater than 0° under a condition of being less than 90°, the antenna gain of the antenna 50 in the range of from 0° to +90° is improved compared to when θH is 0° irrespective of the size of WP. Namely, in the present exemplary embodiment a NULL is not liable to arise in the range of from 0° to +90°. Namely, the present exemplary embodiment is able to suppress a drop in antenna gain in a prescribed direction of the antenna 50 provided to the windshield 28 so as to be separated in the vehicle width direction from the electronic device 32 provided at the vehicle width direction central portion of the upper portion of the windshield 28.

Furthermore, in cases in which the above Equation (1a) is satisfied, the antenna gain in a prescribed direction of the antenna 50 is more readily suppressed from dropping than cases in which the Equation (1a) is not satisfied. Furthermore, in cases in which above Equation (1b) is satisfied, the antenna gain in a prescribed direction of the antenna 50 is more readily suppressed from dropping than cases in which the Equation (1b) is not satisfied. Furthermore, in cases in which above Equation (1c) is satisfied, the antenna gain in a prescribed direction of the antenna 50 is more readily suppressed from dropping than cases in which the Equation (1c) is not satisfied.

Furthermore, in cases in which the above Equation (2a) is satisfied, the antenna gain in a prescribed direction of the antenna 50 is more readily suppressed from dropping than cases in which the Equation (2a) is not satisfied. Furthermore, in cases in which above Equation (2b) is satisfied, the antenna gain in a prescribed direction of the antenna 50 is more readily suppressed from dropping than cases in which the Equation (2b) is not satisfied. Furthermore, in cases in which above Equation (2c) is satisfied, the antenna gain in a prescribed direction of the antenna 50 is more readily suppressed from dropping than cases in which the Equation (2c) is not satisfied. Furthermore, in cases in which Equation (2d) is satisfied, the antenna gain in a prescribed direction of the antenna 50 is more readily suppressed from dropping than cases in which the Equation (2d) is not satisfied.

Furthermore, in cases in which above Equation (2e) is satisfied, the antenna gain in a prescribed direction of the antenna 50 is more readily suppressed from dropping than cases in which the Equation (2e) is not satisfied.

Furthermore, in the present exemplary embodiment, L63 that is a minimum distance between the conductor plate 54 and the metal body of the vehicle body 12 is set to 20 mm or greater. This means that radio wave transmitting and receiving by the antenna 50 is not liable to be impeded by the metal body.

Furthermore, in the present exemplary embodiment the number of antennas 50 provided to the windshield 28 is one. This means that, compared to cases in which plural of the antennas 50 are provided to the windshield 28, the area occupied by the antenna 50 in the space interior side of the vehicle is narrower and also the field of view of an occupant of the vehicle 10 is not liable to be in impeded by the antenna 50. Furthermore, the wiring structure and electric circuit applied in the antenna 50 can be simplified compared to cases in which there are plural of the antennas 50 provided to the windshield 28. Furthermore, good V2X communication can be implemented by a single antenna 50 in cases in which the antenna 50 is, for example, a V2X antenna that transmits and receives vertical polarized waves in the 5.8 GHz band or in the 5.9 GHz band.

Although exemplary embodiments of the present disclosure have been described above, the present disclosure is not limited to these exemplary embodiments.

For example, a case 30A housing single or plural electronic devices 32A may be provided at a vehicle width direction central portion of a vehicle up-down direction upper portion of an interior side of a principal surface (front face) of the rear glass 34, as illustrated in FIG. 1 to FIG. 2, and an antenna 50A positioned further to the right side than the case 30A may be attached in a particular inclined state to the upper portion of the interior side of the vehicle of the principal surface of the rear glass 34. The case 30A has the same structure as that of the case 30, and the antenna 50A has the same structure as that of the antenna 50. In such cases the rear glass 34 and the antenna 50A are configuration elements of an antenna device 40B.

However, depending on the vehicle, aero parts made from resin, such as a roof spoiler, a rear spoiler, a tailgate spoiler, are sometimes provided so as to be separated from the principal surface of the rear glass 34, and sometimes the electronic device 32A is attached to such aero parts. In such cases, sometimes the electronic device 32A is not provided to the upper portion of the interior side of the vehicle of the principal surface of the rear glass 34, and is separated from the upper portion of the principal surface of the rear glass 34. Namely, the electronic device 32A is sometimes provided in the vicinity of an upper portion of one or other principal surface of the rear glass 34. In the present specification "the electronic device 32A is provided in the vicinity of an upper portion of one or other principal surface of the rear glass 34" means that the electronic device 32A is provided to the vehicle 10 such that the electronic device 32A and the upper portion of one or other principal surface of the rear glass 34 are separated from each other by a distance of 200 mm or less. For example, in cases in which the electronic device 32A is provided to a tailgate spoiler, the electronic device 32A is sometimes provided in the vicinity of the upper portion of the principal surface of the rear glass 34 outside the vehicle. Note that when in such cases the electronic device 32A is provided in the vicinity of the upper portion of one or other principal surface of the rear glass 34, the electronic device 32A is provided at a vehicle width direction central portion of the rear glass 34. Namely, as illustrated in FIG. 1, at least a portion of the electronic device 32A (case 30A) is positioned on the center line CL when viewed along the vertical direction. Note that examples of the electronic device 32A provided in the vicinity of the upper portion of the rear glass 34 include an antenna inbuilt into a spoiler, and an imaging device such as a visible light camera and a high-mounted stop light or the like.

The particular inclined state of the antenna device 40B is an inclined state with the radiation surface 56C that is the rear face of the radiation plate 56 being inclined (together with the first element 66 and the second element 68) with respect to the X axis direction and the Y axis direction such that a second end portion 50E2 is positioned further toward a lower edge side of the rear glass 34 than a first end portion 50E1 in plan view. Namely, the second end portion 50E2 of the antenna 50A that is in the particular inclined state is positioned further to the rear side in the vehicle front-rear direction than the first end portion 50E1. An inclination angle θH)(° formed in plan view between the antenna 50A in the particular inclined state and the vehicle width direction (X axis) satisfies 0<θH<90. Note that 15≤θH≤60 is preferable in order to improve antenna gain of the antenna 50A. Furthermore, the antenna gain of the antenna 50A is further improved when 20≤θH≤55. When the θH of the antenna 50A is greater than 0° under a condition of being less than 90° in this manner, the antenna gain of the antenna 50A in the range of 0° to +90° in the horizontal plane is improved compared to when θH is 0° irrespective of the size of WP. In particular the antenna gain is improved in a range of from 0° to ±60°. Note that 90° in such cases indicates the vehicle width direction left side, 270° indicates the vehicle width direction right side, 0° indicates the rear side in the vehicle front-rear direction, and 180° indicates the front side in the vehicle front-rear direction. The measurement results of the directionality of the antenna 50A in such cases are results substantially the same as those of FIG. 8 to FIG. 10, and FIG. 12 to FIG. 14.

Note that in such cases, when looking at a rear section of the vehicle 10 as illustrated in FIG. 2 from the left side along arrow DRr of FIG. 1, an appropriate inclination angle α of the radiation surface 56C of the radiation plate 56 of the antenna 50A with respect to a vertical direction 72 does not fall outside ±15°. The inclination angle α preferably does not fall outside ±10°. The inclination angle α more preferably does not fall outside ±5°, further more preferably does not fall outside ±1°, and is optimally 0°.

In cases in which the antenna 50A is provided to the rear glass 34 of the vehicle 10, an antenna 50 may be either provided to, or not provided to, the windshield 28 of the vehicle 10. In cases in which the antenna 50 is provided to the windshield 28 and the antenna 50A is provided to the rear glass 34 in the embodiment illustrated in FIG. 1, a desirable antenna gain in the horizontal plane can be implemented over a range of from 0° to 360° by a composite value of the antenna gains of the antenna 50 and the antenna 50A.

In cases in which the case 30 and the antenna 50 are attached to the windshield 28, the central position CP2 of the antenna 50 may be positioned further to the right side than the reference position CP1 of the electronic device 32. Moreover, in cases in which the electronic device 32A and the antenna 50A are attached to the rear glass 34, the central position CP2 of the antenna 50A may be positioned further to the left side than the reference position CP1 of the electronic device 32A.

In cases in which the central position CP2 of the antenna 50 is positioned further to the left side than the reference position CP1 of the electronic device 32, the right end portion of the antenna 50 and the left end portion of the electronic device 32 may be positioned on a straight line parallel to the center line CL in plan view along the vertical direction. Similarly, in cases in which the central position CP2 of the antenna 50 is positioned further to the right side than the reference position CP1 of the electronic device 32, the left end portion of the antenna 50 and the right end portion of the electronic device 32 may be positioned on a straight line parallel to the center line CL in plan view along the vertical direction. Moreover, in cases in which the central position CP2 of the antenna 50A is positioned further to the right side than the reference position CP1 of the electronic device 32A, the left end portion of the antenna 50A and the right end portion of the electronic device 32A may be positioned on a straight line parallel to the center line CL in plan view along the vertical direction. Similarly in cases in which the central position CP2 of the antenna 50A is positioned further to the left side than the reference position CP1 of bracket 30A, the right end portion of the antenna 50A and the left end portion of the electronic device 32A may be positioned on a straight line parallel to the center line CL in plan view along the vertical direction.

A medium respectively present between the conductor plates 54 and the radiation plates 56 of the antenna 50 and the antenna 50A may contain at least one of a void (air) or a dielectric substrate. In cases in which this medium is a void (air), the radiation plate 56, the conductor plate 54, the first element 66, and the second element 68 may be fixed to an above-mentioned bracket, omitted in the drawings.

Plural of the antennas 50 may be attached to the windshield 28. Moreover, plural of the antennas 50A may be attached to the rear glass 34.

At least one of the antenna 50 or the antenna 50A may be a slot antenna. In such cases the planar shaped radiation surface of the slot antenna is set inclined with respect to the vehicle width direction and vehicle front-rear direction when the vehicle window glass is viewed along the vehicle up-down direction.

At least one of the first element 66 or the second element 68 may be omitted from at least one of the antenna 50 or the antenna 50A.

The rear glass 34 may be provided to a back door (omitted in the drawings) that opens and closes off an opening provided to a rear section of the vehicle 10.

The entire content of the disclosure of Japanese Patent Application No. 2021-159730 filed on Sep. 29, 2021 is incorporated by reference in the present specification.

All publications, patent applications and technical standards mentioned in the present specification are incorporated by reference in the present specification to the same extent as if each individual publication, patent application, or technical standard was specifically and individually indicated to be incorporated by reference.

What is claimed is:

1. A vehicle antenna device comprising:
   a vehicle window glass attachable to a vehicle so as to configure at least one of a windshield or a rear glass;
   an electronic device provided at a vehicle width direction central portion at or near a vehicle up-down direction upper portion of the vehicle window glass when the vehicle window glass has been attached to the vehicle; and
   an antenna that is provided with a radiation conductor including a radiation surface for transmitting and receiving radio waves of a prescribed frequency band, the radiation conductor being attached to the upper portion of a principal surface at an interior side of the vehicle window glass such that a normal to the radiation surface passes through the principal surface, wherein:
   a vehicle width direction central position of the antenna is separated, by a prescribed distance in the vehicle width direction, from a reference position that is at a vehicle width direction center of the electronic device provided at the central portion at or near the upper portion of the vehicle window glass,
   when the vehicle window glass attached to the vehicle is viewed along the vehicle up-down direction, the radiation surface is in a state inclined with respect to the vehicle width direction and a vehicle front-rear direction such that a second end portion of the radiation surface, which is an end portion on an opposite side from a reference position side of the radiation surface, is positioned further toward a lower edge side of the vehicle window glass than a first end portion, which is an end portion on the reference position side of the radiation surface,
   a vehicle width direction position of a portion of the electronic device is aligned with a center line passing in the vehicle front-rear direction through a vehicle width direction center of the vehicle; and $$(WA/2) \times 0.2 \leq WP \leq (WA/2) \times 0.8 \text{ is satisfied,}$$

wherein WA (mm) is a vehicle width of the vehicle at the vehicle width direction central position of the antenna, and WP (mm) is a distance in the vehicle width direction from the center line to the vehicle width direction central position of the antenna; and
the expression $$0.50 \leq \theta H / \{(WP/(WA/2)) \times 100\} \leq 2.00$$

is satisfied, wherein $\theta H(°)$ is an angle formed between the antenna and the vehicle width direction.

2. The vehicle antenna device of claim 1, wherein the electronic device is attached to the principal surface at the interior side of the vehicle.

3. The vehicle antenna device of claim 1, wherein the angle $\theta H(°)$ is from 15° to 60°.

4. The vehicle antenna device of claim 1, wherein the distance WP (mm) is from 100 mm to 500 mm.

5. The vehicle antenna device of claim 1, wherein a shortest distance between the antenna and a metal body of the vehicle is not less than 20 mm.

6. The vehicle antenna device of claim 1, wherein a shortest distance between a portion of the electronic device where radio waves are emitted and a portion of the antenna where radio waves are emitted is not less than 50 mm.

7. The vehicle antenna device of claim 1, wherein the antenna is provided at the vehicle window glass such that an angle formed between the radiation surface of the antenna and the vehicle up-down direction does not fall outside ±15° when the vehicle is viewed along a width direction of the antenna.

8. The vehicle antenna device of claim 1, wherein there is only a single antenna provided at a single vehicle window glass, and the antenna includes only a single radiation conductor connected to a single feeding portion through a connecting conductor.

9. The vehicle antenna device of claim 1, wherein the antenna is a patch antenna.

10. The vehicle antenna device of claim 1, wherein the antenna is capable of transmitting and receiving radio waves in a 5.8 GHz band or radio waves in a 5.9 GHz band.

11. The vehicle antenna device of claim 1, wherein the vehicle window glass includes the windshield and the rear glass.

* * * * *